United States Patent
Zhou et al.

(10) Patent No.: US 12,520,369 B2
(45) Date of Patent: Jan. 6, 2026

(54) BROADCAST-MULTICAST SERVICE SESSION TRANSMISSION CONTROL METHOD AND DEVICE

(71) Applicant: DATANG MOBILE COMMUNICATIONS EQUIPMENT CO., LTD., Beijing (CN)

(72) Inventors: Rui Zhou, Beijing (CN); Xiaoyan Duan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 325 days.

(21) Appl. No.: 18/260,051

(22) PCT Filed: Nov. 29, 2021

(86) PCT No.: PCT/CN2021/134040
§ 371 (c)(1),
(2) Date: Jun. 30, 2023

(87) PCT Pub. No.: WO2022/148179
PCT Pub. Date: Jul. 14, 2022

(65) Prior Publication Data
US 2024/0057196 A1     Feb. 15, 2024

(30) Foreign Application Priority Data
Jan. 6, 2021   (CN) .......................... 202110014462.9

(51) Int. Cl.
*H04W 76/20*     (2018.01)
*H04L 12/18*     (2006.01)
(Continued)

(52) U.S. Cl.
CPC ........... *H04W 76/20* (2018.02); *H04L 12/189* (2013.01); *H04L 67/143* (2013.01); *H04W 68/02* (2013.01); *H04W 76/40* (2018.02)

(58) Field of Classification Search
CPC ..... H04W 76/20; H04W 68/02; H04W 76/40; H04L 12/189; H04L 67/143
See application file for complete search history.

(56) References Cited

U.S. PATENT DOCUMENTS

| | | | |
|---|---|---|---|
| 2006/0056347 A1 | 3/2006 | Kwak et al. | |
| 2006/0156370 A1* | 7/2006 | Parantainen | H04W 76/40 725/50 |

(Continued)

FOREIGN PATENT DOCUMENTS

| | | |
|---|---|---|
| CN | 1549619 A | 11/2004 |
| CN | 101998262 A | 3/2011 |

(Continued)

OTHER PUBLICATIONS

Office Action issued Oct. 28, 2022 in Chinese Application No. 2021100144629.

(Continued)

*Primary Examiner* — Yaotang Wang
(74) *Attorney, Agent, or Firm* — Harness, Dickey & Pierce, P.L.C.

(57) ABSTRACT

Embodiments of the present disclosure provide a broadcast-multicast service session transmission control method and device. The broadcast-multicast service session transmission control method performed by a user equipment (UE) includes: receiving session state information of a broadcast-multicast service session, transmitted by an access network device; and stopping monitoring a data transmission channel of the broadcast-multicast service session, in case that the session state information indicates that the broadcast-multicast service session is in a release state. Thus, in the embodiments of the present disclosure, when the MBS session is in the release state, the access network device can notify the UE in the MBS session that the MBS session is in (Continued)

--- receiving session state information of a broadcast-multicast service session, transmitted by an access network device — 101 stopping monitoring a data transmission channel of the broadcast-multicast service session, in case that the session state information indicates that the broadcast-multicast service session is in a release state. — 102 the release state, so that the UE can no longer monitor a data transmission channel of the MBS session, thereby saving the power.

18 Claims, 5 Drawing Sheets

(51) Int. Cl.
*H04L 67/143* (2022.01)
*H04W 68/02* (2009.01)
*H04W 76/40* (2018.01)

(56) References Cited

U.S. PATENT DOCUMENTS

| | | |
|---|---|---|
| 2011/0194420 A1 | 8/2011 | Park et al. |
| 2013/0294326 A1 | 11/2013 | Jiao et al. |
| 2016/0157065 A1 | 6/2016 | Lee et al. |
| 2016/0249266 A1* | 8/2016 | Kim ..................... H04W 4/06 |
| 2022/0408228 A1 | 12/2022 | Xiong |
| 2023/0180349 A1 | 6/2023 | Zhu et al. |
| 2023/0180350 A1 | 6/2023 | Zhu et al. |

FOREIGN PATENT DOCUMENTS

| | | |
|---|---|---|
| CN | 102083006 A | 6/2011 |
| CN | 111866755 A | 10/2020 |
| CN | 111901764 A | 11/2020 |
| CN | 111901765 A | 11/2020 |
| CN | 111901766 A | 11/2020 |
| EP | 1631000 A1 | 3/2006 |

OTHER PUBLICATIONS

International Search Report and Written Opinion issued Feb. 17, 2022 in International Application No. PCT/CN202/134040.
Extended European Search Report issued on Nov. 15, 2024 in European Application No. 21917220.2.
ZTE, "Session Start and Stop Indication," 3GPP TSG RAN WG2 Meeting #96, R2-167690, Nov. 18, 2016.

* cited by examiner

BROADCAST-MULTICAST SERVICE SESSION TRANSMISSION CONTROL METHOD AND DEVICE

CROSS-REFERENCE TO RELATED APPLICATIONS

This application is the U.S. national phase of PCT Application PCT/CN2021/134040 filed on Nov. 29, 2021, which claims the priority of Chinese Application No. 202110014462.9, entitled "Broadcast-multicast service session transmission control method and device", filed on Jan. 6, 2021, the disclosure of which is incorporated in its entirety by reference herein.

TECHNICAL FIELD

The present disclosure relates to the field of mobile communication technologies, and in particular to a broadcast-multicast service session transmission control method and device.

BACKGROUND

Multimedia broadcast-multicast service (MBMS), as an important service type, has existed for a long time in 3G and 4G technologies. In the R15 and R16 versions of 5G, only unicast services are supported. In view of importance of MBMS services to certain vertical fields (such as Internet of Vehicles, public safety), MBMS has also been added to the R17 version of 5G.

In the existing 4G technology, a link used to carry MBMS data is referred as an MBMS session in 4G. The MBMS session has only two states: start and stop. On a user equipment (UE) side, when an MBMS session starts, the MBMS session is established, and meanwhile, MBMS data starts to be transmitted on this MBMS session; when the MBMS session is stopped, transmission of the MBMS data on this MBMS session is stopped, and the MBMS session is released at the same time. On an access network side, a service change notification mechanism is used to instruct the UE to start and stop a corresponding service; when the UE is instructed to start the service, the UE starts to monitor a corresponding MBMS service channel.

In the existing 5G technology, a link used to carry MBS data is referred as a MBS session; and procedures related to the MBS session include establishment, release, deactivation (or stop), activation (or start).

For a certain MBS service, the 5G core network establishes a context related to the MBS service at the core network level and allocates resources at the core network level.

In addition, the 5G core network can initiate a procedure of releasing the MBS session. After the MBS session is released, the core network and the access network release all resources related to the MBS session, and do not keep any information about the released MBS session. That is, after the MBS session is released, any information related to the MBS session no longer exists in the 5G system, and then the UE will no longer receive any MBS data from the MBS session.

Further, when the MBS service corresponding to the MBS session has no data transmission for a period of time, the core network can initiate the procedure of deactivating the MBS session. After the MBS session is deactivated, the core network retains information related to the MBS session, and the access network releases all resources related to the MBS session and deletes information related to the MBS session.

In addition, for an MBS session in a deactivated state, when new data arrives, the core network initiates a procedure of activating the MBS session or starting the MBS session. After the access network receives an activation instruction, the access network reconfigures resources related to the MBS session and notifies the UE. After a UE monitoring a corresponding notification message receives the notification, the UE continues to receive MBS data on a corresponding channel.

It can be seen from the above that compared to 4G MBMS sessions, more states are added to 5G MBS sessions; after an MBS session is established, MBS data transmission does not necessarily start immediately, and data transmission starts only after the MBS session is activated or started. When the MBS service has no data transmission temporarily, the MBS session can enter a deactivated state, and when the data transmission restarts, the MBS session is activated again.

In the process of implementing the present disclosure, the inventors found that: after a certain MBS session is released, the MBS session no longer exists from the perspective of the network side, and may not be re-established for a long time thereafter. From the perspective of the UE, the existing notification mechanism only informs the UE that data transmission on the MBS session is stopped. Since the data transmission may restart after the data transmission stops, the UE needs to continue to monitor a data transmission channel of the MBS session, which brings unnecessary power consumption.

SUMMARY

Embodiments of the present disclosure provide a broadcast-multicast service session transmission control method and device, which can solve the problem in the related art that after an MBS session is released, the UE continues to monitor an MBS data transmission channel, thereby causing unnecessary power consumption.

In a first aspect, one embodiment of the present disclosure provides a broadcast-multicast service session transmission control method, applied to a user equipment (UE), including:

receiving session state information of a broadcast-multicast service session, transmitted by an access network device; and stopping monitoring a data transmission channel of the broadcast-multicast service session, in case that the session state information indicates that the broadcast-multicast service session is in a release state.

Optionally, the session state information includes identification information of the broadcast-multicast service session and state indication information of the broadcast-multicast service session.

Optionally, the receiving session state information of a broadcast-multicast service session, transmitted by an access network device, includes:

in case that the broadcast-multicast service session is a multicast session, receiving a paging message transmitted by the access network device, wherein the paging message carries the session state information; or, in case that the broadcast-multicast service session is a multicast session or a broadcast session, receiving a broadcast-multicast service dedicated control message transmitted by the access network device on a broadcast-multicast service control channel, wherein the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, receiving system information transmitted by the access network device, wherein the system information carries the session state information, and the system information is information used to indicate a service change content of the broadcast-multicast service session.

Optionally, in case that the broadcast-multicast service session is a multicast session, the method further includes: in case that the session state information indicates that the multicast session is in a release state, stopping monitoring a first notification message, wherein the first notification message is a notification message used to indicate that a service of the multicast session has changed.

Optionally, in case that the broadcast-multicast service session is a multicast session, the method further includes:

in case that the session state information indicates that the multicast session is in a release state, stopping monitoring a first notification message, wherein the first notification message is a notification message used to indicate that a service of the multicast session has changed.

Optionally, in case that the broadcast-multicast service session is a broadcast session and the session state information is carried in system information, the method further includes:

in case that the session state information indicates that the broadcast session is in a release state, stopping monitoring a second notification message and the system information;

wherein the second notification message is a notification message used to indicate that a service of the broadcast session has changed; and the system information is information used to indicate a service change content of the broadcast-multicast service session.

Optionally, in case that the broadcast-multicast service session is a multicast session, the stopping monitoring the data transmission channel of the broadcast-multicast service session, includes: leaving a multicast service group of the multicast session to stop monitoring the data transmission channel of the multicast session.

Optionally, the leaving a multicast service group of the multicast session, includes:

transmitting a leave request to a core network device through the access network device, wherein the leave request is used to instruct the core network device to remove the UE from the multicast service group of the multicast session;

or, leaving the multicast service group of the broadcast-multicast service session.

In a second aspect, one embodiment of the present disclosure provides a broadcast-multicast service session transmission control method, applied to an access network device, including:

in case that a state of a broadcast-multicast service session changes, transmitting session state information of the broadcast-multicast service session to a user equipment (UE) in the broadcast-multicast service session.

Optionally, the session state information includes identification information of the broadcast-multicast service session and state indication information of the broadcast-multicast service session.

Optionally, the transmitting session state information of the broadcast-multicast service session to a user equipment (UE) in the broadcast-multicast service session, includes:

in case that the broadcast-multicast service session is a multicast session, transmitting a paging message to the UE, wherein the paging message carries the session state information;

or, in case that the broadcast-multicast service session is a multicast session or a broadcast session, transmitting a broadcast-multicast service dedicated control message to the UE on a broadcast-multicast service control channel, wherein the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, transmitting system information to the UE, wherein the system information carries the session state information, and the system information is information used to indicate a service change content of the broadcast-multicast service session.

In a third aspect, one embodiment of the present disclosure provides a user equipment (UE), including: a first memory, a first transceiver and a first processor;

wherein the first memory is used to store a computer program;

the first transceiver is used to transmit and receive data under the control of the first processor;

the first processor is used to read the computer program in the first memory and perform the following operations:

controlling the first transceiver to receive session state information of a broadcast-multicast service session, transmitted by an access network device;

stopping monitoring a data transmission channel of the broadcast-multicast service session, in case that the session state information indicates that the broadcast-multicast service session is in a release state.

Optionally, the session state information includes identification information of the broadcast-multicast service session and state indication information of the broadcast-multicast service session.

Optionally, when receiving the session state information of the broadcast-multicast service session transmitted by the access network device, the first transceiver is used to, in case that the broadcast-multicast service session is a multicast session, receive a paging message transmitted by the access network device, wherein the paging message carries the session state information;

or, in case that the broadcast-multicast service session is a multicast session or a broadcast session, receive a broadcast-multicast service dedicated control message transmitted by the access network device on a broadcast-multicast service control channel, wherein the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, receive system information transmitted by the access network device, wherein the system information carries the session state information, and the system information is information used to indicate a service change content of the broadcast-multicast service session.

Optionally, in case that the broadcast-multicast service session is a multicast session, the first processor is further used to, in case that the session state information indicates that the multicast session is in a release state, stop monitoring a first notification message, wherein the first notification message is a notification message used to indicate that a service of the multicast session has changed.

Optionally, in case that the broadcast-multicast service session is a broadcast session and the session state information is carried in a broadcast-multicast service dedicated control message, the first processor is further used to, in case that the session state information indicates that the broadcast session is in a release state, stop monitoring a second notification message and the broadcast-multicast service dedicated control message;

wherein the second notification message is a notification message used to indicate that a service of the broadcast session has changed; and the broadcast-multicast service dedicated control message is a message used to indicate a service change content of the broadcast-multicast service session.

Optionally, in case that the broadcast-multicast service session is a broadcast session and the session state information is carried in system information, the first processor is further used to, in case that the session state information indicates that the broadcast session is in a release state, stop monitoring a second notification message and the system information;

wherein the second notification message is a notification message used to indicate that a service of the broadcast session has changed; and the system information is information used to indicate a service change content of the broadcast-multicast service session.

Optionally, in case that the broadcast-multicast service session is a multicast session, the first processor is further used to, leave a multicast service group of the multicast session, to stop monitoring the data transmission channel of the multicast service session.

Optionally, when leaving the multicast service group of the multicast session, the first processor is further used to, control the first transceiver to transmit a leave request to a core network device through the access network device, wherein the leave request is used to instruct the core network device to remove the UE from the multicast service group of the multicast session;

or, leave the multicast service group of the broadcast-multicast service session.

In a fourth aspect, one embodiment of the present disclosure provides an access network device, including: a second memory, a second transceiver and a second processor;

wherein the second memory is used to store a computer program;

the second transceiver is used to transmit and receive data under the control of the second processor;

the second processor is configured to read the computer program in the second memory and perform the following operations:

in case that a state of a broadcast-multicast service session changes, controlling the second transceiver to transmit session state information of the broadcast-multicast service session to a user equipment (UE) in the broadcast-multicast service session.

Optionally, the session state information includes identification information of the broadcast-multicast service session and state indication information of the broadcast-multicast service session.

Optionally, when transmitting the session state information of the broadcast-multicast service session to the UE in the broadcast-multicast service session, the second transceiver is used to, in case that the broadcast-multicast service session is a multicast session, transmit a paging message to the UE, wherein the paging message carries the session state information;

or, in case that the broadcast-multicast service session is a multicast session or a broadcast session, transmit a broadcast-multicast service dedicated control message to the UE on a broadcast-multicast service control channel, wherein the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, transmit system information to the UE, wherein the system information carries the session state information, and the system information is information used to indicate a service change content of the broadcast-multicast service session.

In a fifth aspect, one embodiment of the present disclosure provides a broadcast-multicast service session transmission control device, applied to a user equipment (UE), including:

a state information receiving module used to receive session state information of a broadcast-multicast service session, transmitted by an access network device; and a first processing module used to stop monitoring a data transmission channel of the broadcast-multicast service session, in case that the session state information indicates that the broadcast-multicast service session is in a release state.

In a sixth aspect, one embodiment of the present disclosure provides a broadcast-multicast service session transmission control device, applied to an access network device, including:

a state information transmission module configured to, in case that a state of a broadcast-multicast service session changes, transmit session state information of the broadcast-multicast service session to a user equipment (UE) in the broadcast-multicast service session.

In a seventh aspect, one embodiment of the present disclosure provides a processor-readable storage medium, including a computer program stored thereon; wherein the computer program is used to enable a processor to execute the method described above.

In an eighth aspect, one embodiment of the present disclosure provides a computer program, including computer readable codes; wherein the computer readable codes, when run on a computing processing device, cause the computing processing device to execute the method described above.

In a ninth aspect, one embodiment of the present disclosure provides a computer-readable medium, in which the computer program as described in the eighth aspect above is stored.

In the embodiment of the present disclosure, the UE can receive the session state information of the MBS session transmitted by the access network device, and stop monitoring the data transmission channel of the MBS session in case that the session state information indicates that the MBS session is in the release state. It can be seen that, in the embodiments of the present disclosure, when the MBS session is in the release state, the access network device can notify the UE in the MBS session that the MBS session is in the release state, so that the UE can no longer monitor the data transmission channel of the MBS session, thereby saving the power.

The above description is only an overview of the technical solution of the present disclosure. In order to better understand the technical solution of the present disclosure, it can be implemented according to contents of the description, and in order to make the above and other purposes, features and advantages of the present disclosure easily understood, the specific embodiments of the present disclosure are listed hereinafter.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
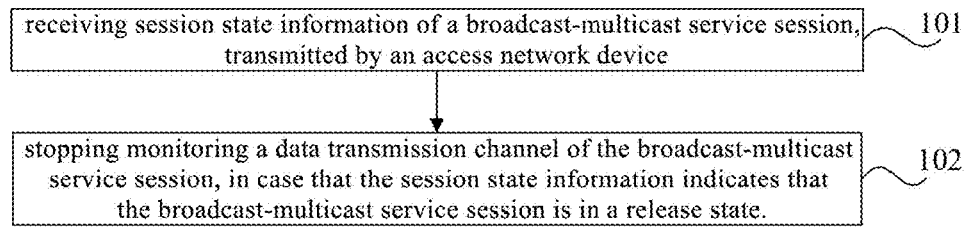
FIG. 1 is a flowchart of a broadcast-multicast service session transmission control method applied to a user equipment (UE) according to an embodiment of the present disclosure.

In order to make objects, technical solutions and advantages of embodiments of the present disclosure more apparent, the technical solutions in the embodiments of the present disclosure will be described hereinafter in a clear and complete manner in conjunction with the accompanying drawings of the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The terms "and/or" in the embodiments of the present disclosure are used to describe association relationship between associated objects, and indicate that there may be three relationships, for example, A and/or B means there are three situations, i.e., there is A alone, there are both of A and B, or, there is B alone. The character "I" generally means that relationship between associated objects before and after the character "I" is "or".

The term "plurality" in the embodiments of the present disclosure means two or more, and other quantifiers are similar.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a broadcast-multicast service session transmission control method and device, which can solve the problem in the related art that after an MBS session is released, the UE continues to monitor a MBS data transmission channel, thereby causing unnecessary power consumption.

The method and the device are based on the same concept. Since principles of the method and the device for solving the problems are similar, implementation of the device and the method can be referred to each other, and duplication is not repeated.

The technical solutions provided in the embodiments of the present disclosure may be applicable to various systems, especially the fifth generation communication (5G) system. For example, applicable systems may be global system of mobile communication (GSM) system, code division multiple access (CDMA) system, wideband code division multiple access (WCDMA) general packet wireless service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, etc. Each of the various systems includes a user equipment and a network device. The system may further include a core network part, such as an evolved packet system (EPS), a 5G system (5GS).

The terminal devices involved in the embodiments of the present disclosure may be a device that provides voice and/or data connectivity to a user, a handheld device with a wireless connection function, or other processing device coupled to a wireless modem. In different systems, names of terminal devices may be different. For example, in the 5G system, the terminal device may be referred as user equipment (UE). A wireless terminal device may communicate with one or more core networks (CN) via a radio access network (RAN). The wireless terminal device may be a mobile terminal device such as a mobile phone (or referred as cell phone), or a computer with a mobile terminal device, such as a portable, pocket-sized, handheld, computer built-in or car mobile device, which exchange language and/or data with wireless access networks, for example, a personal communication service (PCS) phone, a cordless phone, a session initiated protocol (SIP) phone, a wireless local loop (WLL) station, a personal digital assistant (PDA) and other device. The wireless terminal device may also be referred to as system, subscriber unit, subscriber station, mobile station, mobile, remote station, access point, remote terminal, access terminal, user terminal, user agent, or user device, which are not limited in the embodiments of the present disclosure.

The network device (i.e., an access network device and a core network device) involved in the embodiments of the present disclosure may be a base station, and the base station may include a plurality of cells for providing services for the terminal. According to different specific application scenarios, the base station may also be referred as an access point, or the base station may be a device in an access network that communicates with wireless terminal devices through one or more sectors on air interfaces, or other names. The network device may be used to exchange received frames with internet protocol (IP) packets, and act as a router between the wireless terminal device and the rest of the access network, where the rest of the access network may include an internet protocol (IP) communication network. The network device may also coordinate attribute management for air interfaces. For example, the network device involved in the embodiments of the present disclosure may be a base transceiver station (BTS) in global system for mobile communications (GSM) or code division multiple access (CDMA), a NodeB in wide-band code division multiple access (WCDMA), an evolutional Node B (eNB or e-NodeB) in long term evolution (LTE) system, a 5G base station (gNB) in the 5G network architecture (next generation system), a home evolved Node B (HeNB), a relay node, a femto, or a pico, which are not limited in the embodiments of the present disclosure. In some network structures, the network device may include a centralized unit (CU) node and a distributed unit (DU) node; and the centralized unit and the distributed unit may also be geographically separated.

Each of the network device and the terminal can use one or more antennas for multi input multi output (MIMO) transmission between the network device and the terminal. The MIMO transmission may be single user MIMO (SU-MIMO), or multiple user MIMO (MU-MIMO). According to forms and numbers of antenna combinations, MIMO transmission may be two dimensional-MIMO (2D-MIMO), three dimensional-MIMO (3D-MIMO), full dimensional-MIMO (FD-MIMO), or massive-MIMO, or diversity transmission, precoding transmission, or beamforming transmission.

FIG. 1 is a schematic flowchart of a broadcast-multicast service session transmission control method according to an embodiment of the present disclosure. The method is applied to a UE. As shown in FIG. 1, the method may include the following steps 101-102.

Step 101: receiving session state information of a broadcast-multicast service session, transmitted by an access network device.

When a state of an MBS session changes, a core network device triggers the access network device to transmit the session state information of the MBS session to the UE in the MBS session (i.e., the UE that receives service data of the MBS session).

Further, the session state information is used to indicate a state of the MBS session. Optionally, the session state information includes identification information of the MBS session and state indication information of the MBS session. The state indication information is used to indicate which state of an establishment, release, deactivation and activation state, the MBS session is in. Therefore, the session state information can clearly indicate which session is in which state.

It can be seen that, in the embodiments of the present disclosure, after the MBS session enters a release state, the access network device may notify the UE in the MBS session that the MBS session is in the release state.

Step 102: stopping monitoring a data transmission channel of the broadcast-multicast service session, in case that the session state information indicates that the broadcast-multicast service session is in a release state.

In the embodiment of the present disclosure, after the session state information received by the UE indicates that the MBS session being received by the UE enters the release state, the UE stops monitoring the data transmission channel of the MBS session, thereby saving the power of the UE.

It can be seen from the above that, in the embodiment of the present disclosure, the UE can receive the session state information of the MBS session transmitted by the access network device, and stop monitoring the data transmission channel of the MBS session in case that the session state information indicates that the MBS session is in the release state. It can be seen that, in the embodiments of the present disclosure, when the MBS session is in the release state, the access network device can notify the UE in the MBS session that the MBS session is in the release state, so that the UE can no longer monitor the data transmission channel of the MBS session, thereby saving the power.

Optionally, the receiving session state information of a broadcast-multicast service session, transmitted by an access network device, includes:
 in case that the broadcast-multicast service session is a multicast session, receiving a paging message transmitted by the access network device, where the paging message carries the session state information;
 or,
 in case that the broadcast-multicast service session is a multicast session or a broadcast session, receiving a broadcast-multicast service dedicated control message transmitted by the access network device on a broadcast-multicast service control channel, where the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, receiving system information transmitted by the access network device, where the system information carries the session state information, and the system information is information used to indicate a service change content of the broadcast-multicast service session.

That is, in case that the multicast session is released, the access network device can indicate, in the paging message, an identifier and a release state of the released multicast session. In case that the multicast session undergoes a state change other than release, the access network device can indicate, in the paging message, an identifier and a state of the multicast session whose state has changed.

In case that the multicast session or broadcast session is released, the access network can indicate, in the MBS dedicated control message, an identifier and a release state of the released multicast session or broadcast session. In case that the multicast session or broadcast session undergoes a state change other than release, the access network device can indicate, in the MBS dedicated control message, an identifier and a state of the multicast session or broadcast session whose state has changed.

In case that the multicast session or broadcast session is released, the access network can indicate, in the system information, an identifier and a release state of the released multicast session or broadcast session. In case that the multicast session or broadcast session undergoes a state change other than release, the access network device can indicate, in the system information, an identifier and a state of the multicast session or broadcast session whose state has changed.

In other words, the access network device can transmit the session state information of the MBS session to the UE in any one of the following manners.

Manner 1: in case that the MBS session is a multicast session, the access network device transmits a paging message carrying the session state information of the MBS session, to the UE.

Manner 2: in case that the MBS session is a multicast session or a broadcast session, the access network device uses the MBS dedicated control message to carry the session state information of the MBS session, and transmits the MBS dedicated control message to the UE.

Manner 3: in case that the MBS session is a multicast session or a broadcast session, the access network device uses the system information to carry the session state information of the MBS session, and transmits the system information to the UE.

The above manner 1, manner 2 and manner 3 are all applicable to multicast sessions, while the manner 1 is not applicable to broadcast sessions, and the manner 2 and manner 3 are all applicable to broadcast sessions.

Optionally, in case that the broadcast-multicast service session is a multicast session, the method further includes:

in case that the session state information indicates that the multicast session is in a release state, stopping monitoring a first notification message, where the first notification message is a notification message used to indicate that a service of the multicast session has changed.

It can be seen that, in the embodiment of the present disclosure, in case that the MBS session is a multicast session and the session state information received by the UE indicates that the multicast session is in the release state, the UE may also stop monitoring the notification message used to indicate that the service of the multicast session has changed, thereby further saving the power of the UE.

Optionally, in case that the broadcast-multicast service session is a broadcast session and the session state information is carried in the broadcast-multicast service dedicated control message, the method further includes:

in case that the session state information indicates that the broadcast session is in a release state, stopping monitoring a second notification message and the broadcast-multicast service dedicated control message;

where the second notification message is a notification message used to indicate that a service of the broadcast session has changed; and the broadcast-multicast service dedicated control message is a message used to indicate a service change content of the broadcast-multicast service session.

It should be noted here that in case that the MBS session is a broadcast session, the MBS dedicated control message is a message used to indicate a service change content of the broadcast session. The service change content is service change detailed information. Therefore, the MBS dedicated control message used to indicate a service change content of the broadcast session, is an MBS dedicated control message used to indicate service change detailed information of the broadcast session.

It can be seen that, in the embodiments of the present disclosure, in case that the MBS session is a broadcast session and the session state information received by the UE indicates that the broadcast session is in a release state, the UE may also stop monitoring the notification message used to indicate that the service of the broadcast session has changed, and stop monitoring the MBS dedicated control message used to indicate service change detailed information of the broadcast session, thereby further saving the power of the UE.

Optionally, in case that the broadcast-multicast service session is a broadcast session and the session state information is carried in system information, the method further includes:

in case that the session state information indicates that the broadcast session is in a release state, stopping monitoring a second notification message and the system information;

where the second notification message is a notification message used to indicate that a service of the broadcast session has changed; and the system information is information used to indicate a service change content of the broadcast-multicast service session.

It should be noted here that in case that the MBS session is a broadcast session, the system information is information used to indicate a service change content of the broadcast session. The service change content is service change detailed information. Therefore, the system information used to indicate a service change content of the broadcast session, is system information used to indicate service change detailed information of the broadcast session.

It can be seen that, in the embodiments of the present disclosure, in case that the MBS session is a broadcast session and the session state information received by the UE indicates that the broadcast session is in a release state, the UE may also stop monitoring the notification message used to indicate that the service of the broadcast session has changed, and stop monitoring the system information used to indicate service change detailed information of the broadcast session, thereby further saving the power of the UE.

Optionally, in case that the broadcast-multicast service session is a multicast session, the stopping monitoring the data transmission channel of the broadcast-multicast service session, includes:

leaving a multicast service group of the multicast session to stop monitoring the data transmission channel of the multicast session.

It can be seen that, in case that the MBS session is a multicast session, the UE may leave the multicast service group of the multicast session, so as to stop monitoring the data transmission channel of the multicast session.

Optionally, the leaving a multicast service group of the multicast session, includes:

transmitting a leave request to a core network device through the access network device, where the leave request is used to instruct the core network device to remove the UE from the multicast service group of the multicast session;

or, leaving the multicast service group of the broadcast-multicast service session.

After the core network device receives the leave request, the core network device removes the UE from the multicast service group of the multicast session.

It can be seen that the UE may request the core network device to remove the UE from the multicast service group of the multicast session, or may leave the multicast service group of the multicast session locally.

Figure 2:
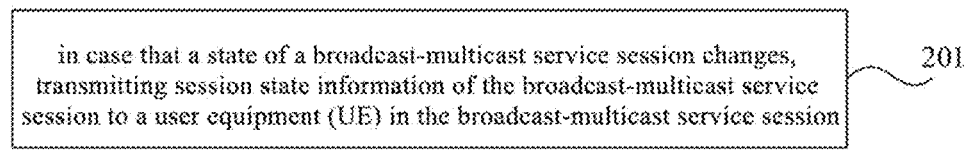
FIG. 2 is a flowchart of a broadcast-multicast service session transmission control method applied to an access network device according to an embodiment of the present disclosure.

FIG. 2 is a schematic flowchart of a broadcast-multicast service session transmission control method according to an embodiment of the present disclosure. The method is applied to an access network device. As shown in FIG. 2, the method may include the following step 201.

Step 201: in case that a state of a broadcast-multicast service session changes, transmitting session state information of the broadcast-multicast service session to a user equipment (UE) in the broadcast-multicast service session.

When a state of an MBS session changes, a core network device triggers the access network device to transmit the session state information of the MBS session to the UE in the MBS session (i.e., the UE that receives service data of the MBS session).

In addition, the session state information is used to indicate a state of the MBS session. Optionally, the session state information includes identification information of the MBS session and state indication information of the MBS session. The state indication information is used to indicate which state of an establishment, release, deactivation and activation state, the MBS session is in. Therefore, the session state information can clearly indicate which session is in which state.

It can be seen that, in the embodiments of the present disclosure, after the MBS session enters a release state, the access network device may notify the UE in the MBS session that the MBS session is in the release state.

After the session state information received by the UE indicates that the MBS session being received by the UE enters the release state, the UE stops monitoring the data transmission channel of the MBS session, thereby saving the power of the UE.

It can be seen from the above that, in the embodiment of the present disclosure, the UE can receive the session state information of the MBS session transmitted by the access network device, and stop monitoring the data transmission channel of the MBS session in case that the session state information indicates that the MBS session is in the release state. It can be seen that, in the embodiments of the present disclosure, when the MBS session is in the release state, the access network device can notify the UE in the MBS session that the MBS session is in the release state, so that the UE can no longer monitor the data transmission channel of the MBS session, thereby saving the power.

Optionally, the transmitting session state information of the broadcast-multicast service session to a user equipment (UE) in the broadcast-multicast service session, includes:

in case that the broadcast-multicast service session is a multicast session, transmitting a paging message to the UE, where the paging message carries the session state information;

or, in case that the broadcast-multicast service session is a multicast session or a broadcast session, transmitting a broadcast-multicast service dedicated control message to the UE on a broadcast-multicast service control channel, where the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, transmitting system information to the UE, where the system information carries the session state information, and the system information is information used to indicate a service change content of the broadcast-multicast service session.

That is, in case that the multicast session is released, the access network device can indicate, in the paging message, an identifier and a release state of the released multicast session. In case that the multicast session undergoes a state change other than release, the access network device can indicate, in the paging message, an identifier and a state of the multicast session whose state has changed.

In case that the multicast session or broadcast session is released, the access network can indicate, in the MBS dedicated control message, an identifier and a release state of the released multicast session or broadcast session. In case that the multicast session or broadcast session undergoes a state change other than release, the access network device can indicate, in the MBS dedicated control message, an identifier and a state of the multicast session or broadcast session whose state has changed.

In case that the multicast session or broadcast session is released, the access network can indicate, in the system information, an identifier and a release state of the released multicast session or broadcast session. In case that the multicast session or broadcast session undergoes a state change other than release, the access network device can indicate, in the system information, an identifier and a state of the multicast session or broadcast session whose state has changed.

In other words, the access network device can transmit the session state information of the MBS session to the UE in any one of the following manners.

Manner 1: in case that the MBS session is a multicast session, the access network device transmits a paging message carrying the session state information of the MBS session, to the UE.

Manner 2: in case that the MBS session is a multicast session or a broadcast session, the access network device uses the MBS dedicated control message to carry the session state information of the MBS session, and transmits the MBS dedicated control message to the UE.

Manner 3: in case that the MBS session is a multicast session or a broadcast session, the access network device uses the system information to carry the session state information of the MBS session, and transmits the system information to the UE.

The above manner 1, manner 2 and manner 3 are all applicable to multicast sessions, while the manner 1 is not applicable to broadcast sessions, and the manner 2 and manner 3 are all applicable to broadcast sessions.

To sum up, a specific implementation manner of the broadcast-multicast service session transmission control method according to an embodiment of the present disclosure may be one of the following implementation manners 1 to 5.

Figure 3:
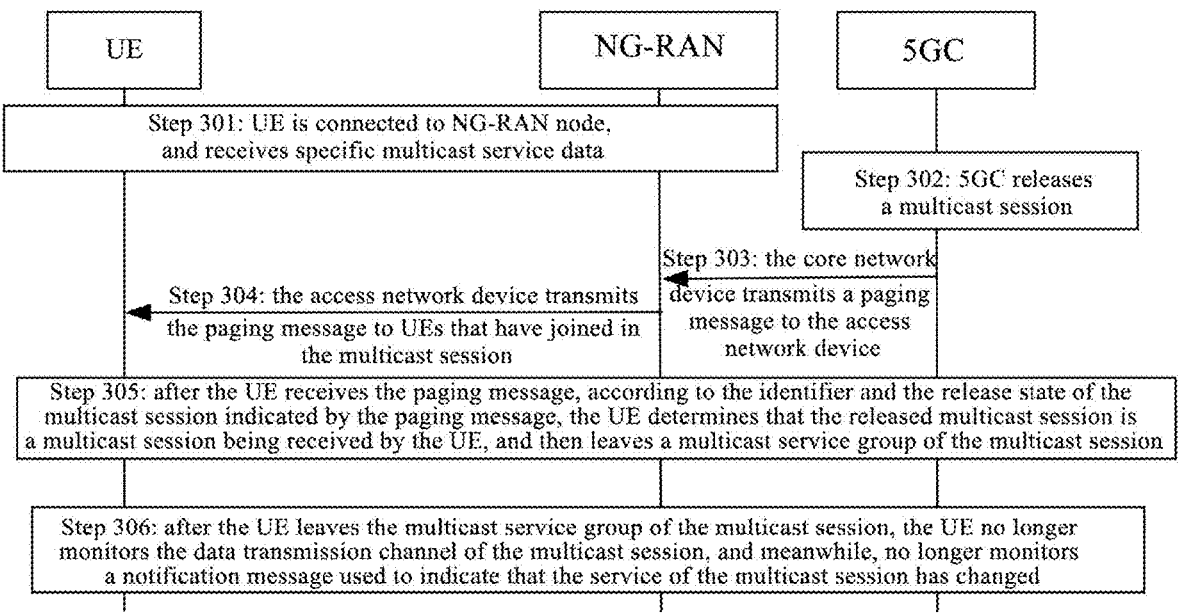
FIG. 3 is a first flowchart of a specific implementation of a broadcast-multicast service session transmission control method according to an embodiment of the present disclosure.

Implementation manner one: as shown in FIG. 3, this implementation manner includes the following steps 301 to 306.

At step 301, a UE is connected to a 5G next generation radio access network (NG-RAN) node, and receives specific multicast service data; where the NG-RAN node is an access network device.

At step 302, a core network device (5GC) releases a multicast session.

At step 303, the core network device initiates paging, i.e., transmitting a paging message to the access network device, where the paging message includes an identifier of the released multicast session and its corresponding release state.

At step 304, the access network device transmits the paging message to UEs that have joined in the multicast session.

At step 305, after the UE receives the paging message, according to the identifier and the release state of the multicast session indicated by the paging message, the UE determines that the released multicast session is a multicast session being received by the UE, and then leaves a multicast service group of the multicast session in a manner which can be the following manner 1 or manner 2:

Manner 1: the UE transmits a leave request to the access network device, so that the access network device forwards the leave request to the core network device, and then the core network device removes the UE from the multicast service group of the multicast session;

Manner 2: the UE locally leaves the multicast service group of the multicast session.

At step 306, after the UE leaves the multicast service group of the multicast session, the UE no longer monitors the data transmission channel of the multicast session, and meanwhile, no longer monitors a notification message used to indicate that the service of the multicast session has changed.

It can be seen that, in this embodiment, after the UE receives the identifier of the released multicast session and its corresponding release state in the paging message, the UE can initiate a procedure of leaving the multicast service group of the multicast session, or locally leave the multicast service of the multicast session group, and stop receiving notification messages for indicating that the service of the multicast session has changed.

Figure 4:
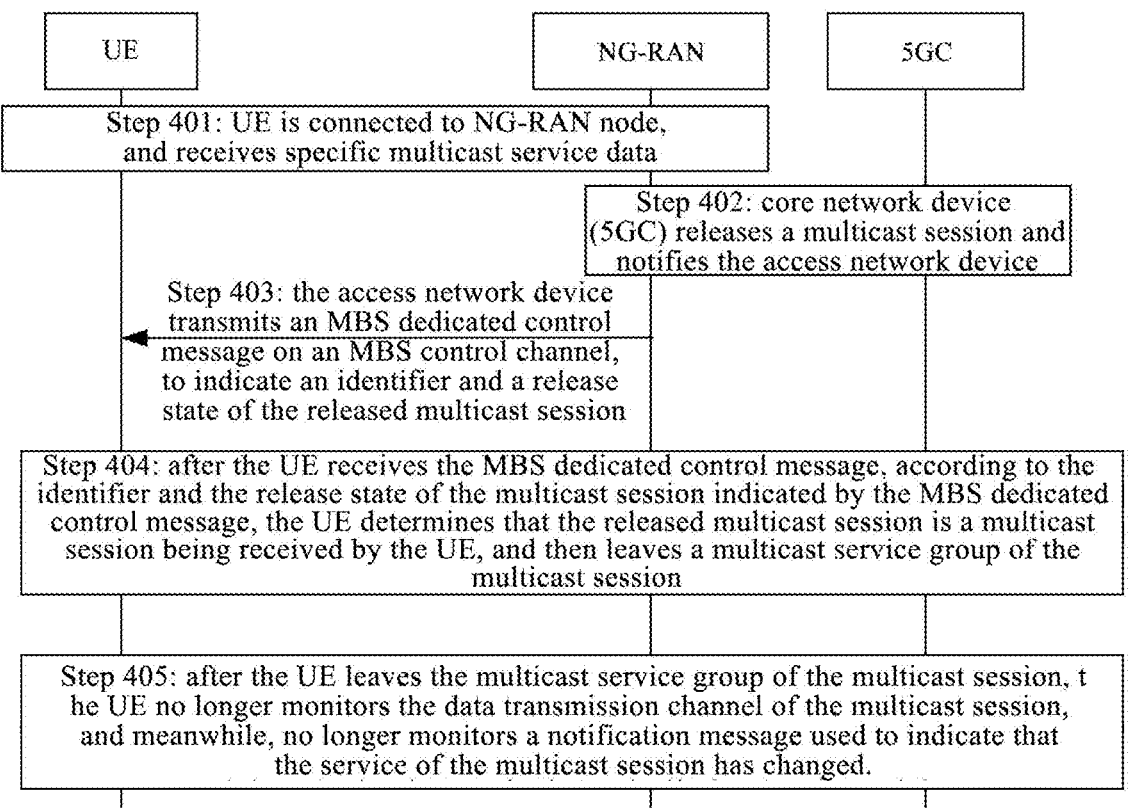
FIG. 4 is a second flowchart of a specific implementation of a broadcast-multicast service session transmission control method according to an embodiment of the present disclosure.

Implementation manner two: as shown in FIG. 4, this implementation manner includes the following steps 401 to 405.

At step 401, a UE is connected to a 5G next generation radio access network (NG-RAN) node, and receives specific multicast service data; where the NG-RAN node is an access network device.

At step 402, a core network device (5GC) releases a multicast session and notifies the access network device.

At step 403, the access network device transmits an MBS dedicated control message on an MBS control channel, to indicate an identifier and a release state of the released multicast session.

At step 404, after the UE receives the MBS dedicated control message, according to the identifier and the release state of the multicast session indicated by the MBS dedicated control message, the UE determines that the released multicast session is a multicast session being received by the UE, and then leaves a multicast service group of the multicast session in a manner which can be the following manner 1 or manner 2:

Manner 1: the UE transmits a leave request to the access network device, so that the access network device forwards the leave request to the core network device, and then the core network device removes the UE from the multicast service group of the multicast session;

Manner 2: the UE locally leaves the multicast service group of the multicast session.

At step 405, after the UE leaves the multicast service group of the multicast session, the UE no longer monitors the data transmission channel of the multicast session, and meanwhile, no longer monitors a notification message used to indicate that the service of the multicast session has changed.

It can be seen that, in this embodiment, after the UE receives the identifier of the released multicast session and its corresponding release state in the MBS dedicated control message, the UE can initiate a procedure of leaving the multicast service group of the multicast session, or locally leave the multicast service of the multicast session group, and stop receiving notification messages for indicating that the service of the multicast session has changed.

Figure 5:
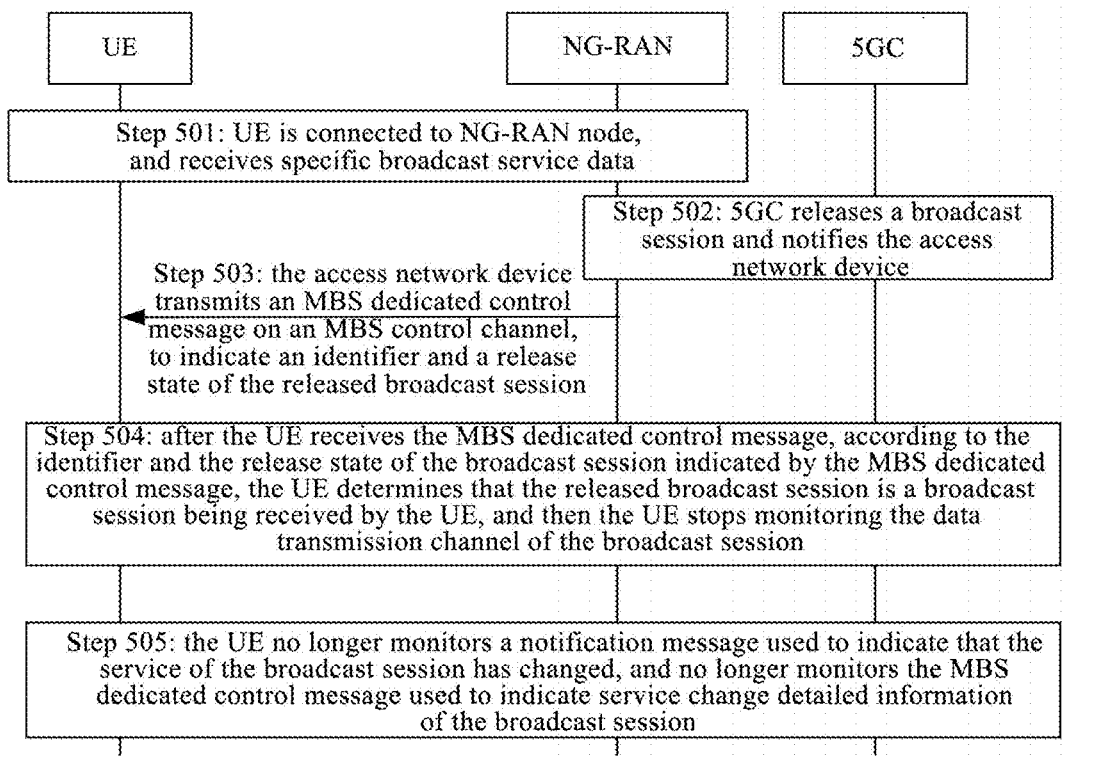
FIG. 5 is a third flowchart of a specific implementation of a broadcast-multicast service session transmission control method according to an embodiment of the present disclosure.

Implementation manner three: as shown in FIG. 5, this implementation manner includes the following steps 501 to 505.

At step 501, a UE is connected to a 5G next generation radio access network (NG-RAN) node, and receives specific broadcast service data; where the NG-RAN node is an access network device.

At step 502, a core network device (5GC) releases a broadcast session and notifies the access network device.

At step 503, the access network device transmits an MBS dedicated control message on an MBS control channel, to indicate an identifier and a release state of the released broadcast session.

At step 504, after the UE receives the MBS dedicated control message, according to the identifier and the release state of the broadcast session indicated by the MBS dedicated control message, the UE determines that the released broadcast session is a broadcast session being received by the UE, and then the UE stops monitoring the data transmission channel of the broadcast session.

Optionally, the implementation manner three may further include a step 505 that the UE no longer monitors a notification message used to indicate that the service of the broadcast session has changed, and no longer monitors the MBS dedicated control message used to indicate service change detailed information of the broadcast session.

It can be seen that, in the embodiments, after the UE receives the identifier of the released broadcast session and its corresponding release state in the MBS dedicated control message, the UE stops monitoring the data transmission channel of the broadcast session, and optionally stops receiving notification messages for indicating that the service of the broadcast session has changed.

Figure 6:
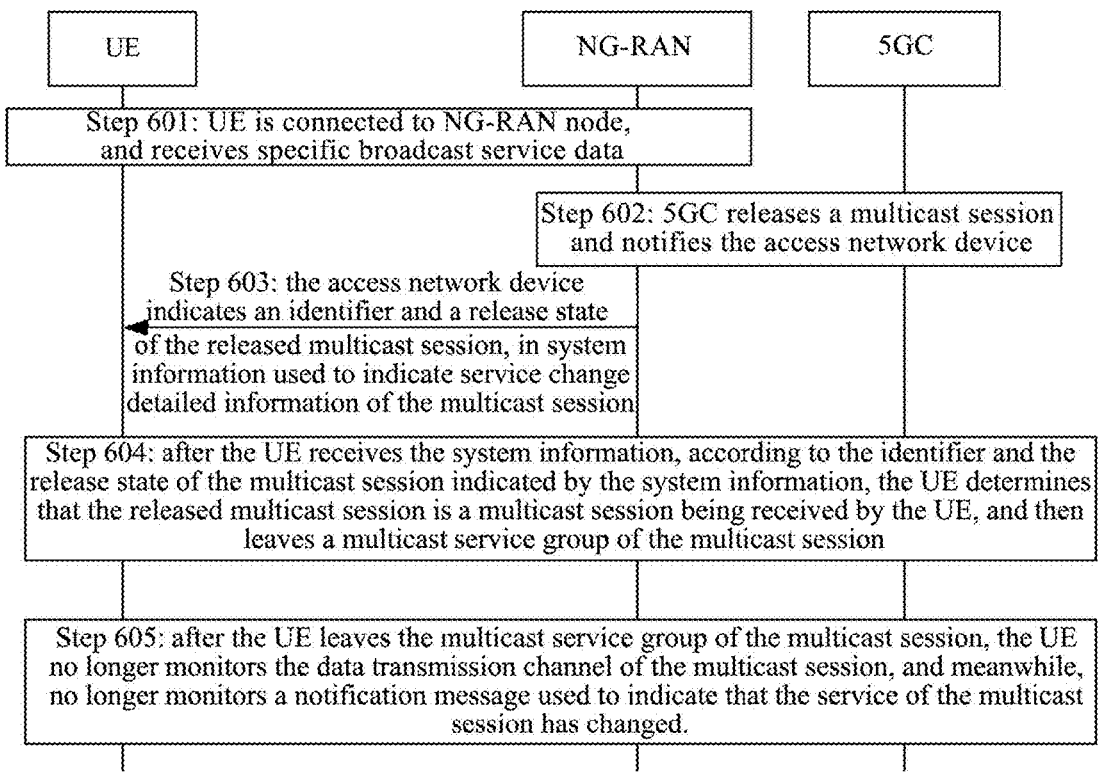
FIG. 6 is a fourth flowchart of a specific implementation of a broadcast-multicast service session transmission control method according to an embodiment of the present disclosure.

Implementation manner four: as shown in FIG. 6, this implementation manner includes the following steps 601 to 605.

At step 601, a UE is connected to a 5G next generation radio access network (NG-RAN) node, and receives specific multicast service data; where the NG-RAN node is an access network device.

At step 602, a core network device (5GC) releases a multicast session and notifies the access network device.

At step 603, the access network device indicates an identifier and a release state of the released multicast session, in system information used to indicate service change detailed information of the multicast session.

At step 604, after the UE receives the system information, according to the identifier and the release state of the multicast session indicated by the system information, the UE determines that the released multicast session is a multicast session being received by the UE, and then leaves a multicast service group of the multicast session in a manner which can be the following manner 1 or manner 2:

Manner 1: the UE transmits a leave request to the access network device, so that the access network device forwards the leave request to the core network device, and then the core network device removes the UE from the multicast service group of the multicast session;

Manner 2: the UE locally leaves the multicast service group of the multicast session.

At step 605, after the UE leaves the multicast service group of the multicast session, the UE no longer monitors the data transmission channel of the multicast session, and meanwhile, no longer monitors a notification message used to indicate that the service of the multicast session has changed.

It can be seen that, in this embodiment, after the UE receives the identifier of the released multicast session and its corresponding release state in the system information, the UE can initiate a procedure of leaving the multicast service group of the multicast session, or locally leave the multicast service of the multicast session group, and stop receiving notification messages for indicating that the service of the multicast session has changed.

Figure 7:
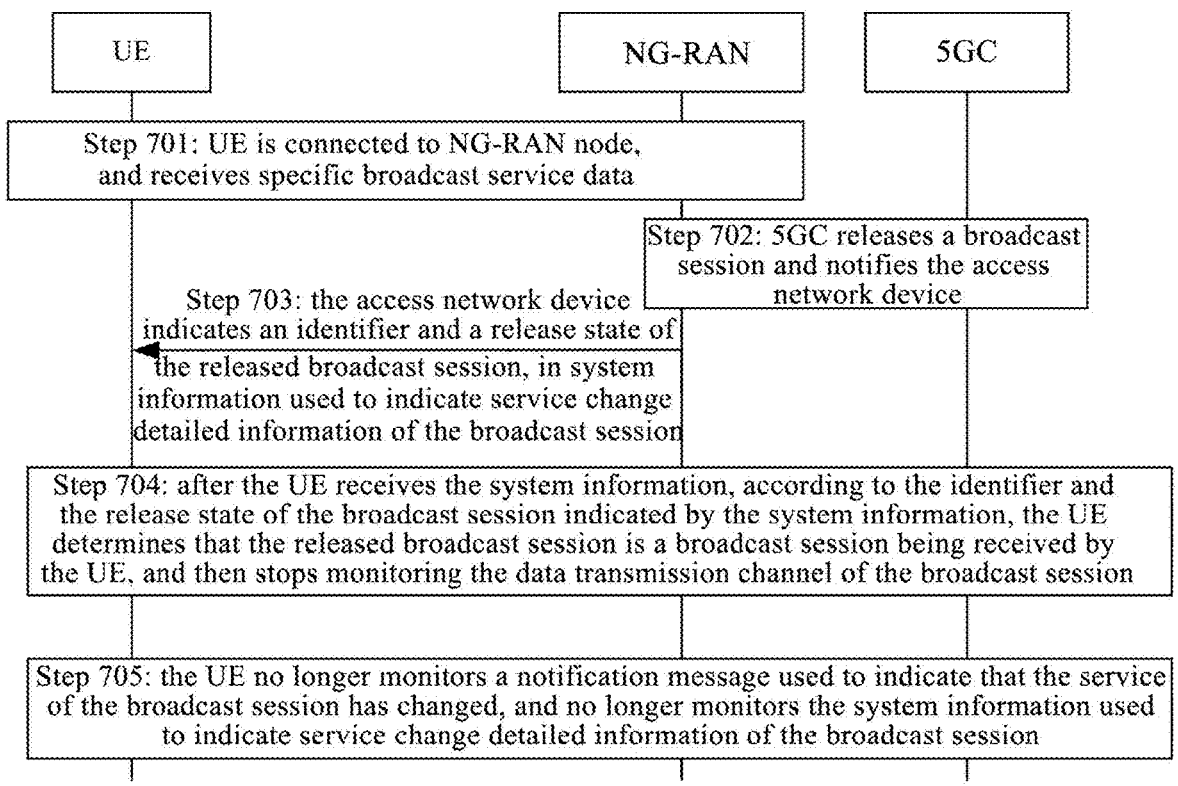
FIG. 7 is a fifth flowchart of a specific implementation of a broadcast-multicast service session transmission control method according to an embodiment of the present disclosure.

Implementation manner five: as shown in FIG. 7, this implementation manner includes the following steps 701 to 705.

At step 701, a UE is connected to a 5G next generation radio access network (NG-RAN) node, and receives specific broadcast service data; where the NG-RAN node is an access network device.

At step 702, a core network device (5GC) releases a broadcast session and notifies the access network device.

At step 703, the access network device indicates an identifier and a release state of the released broadcast session, in system information used to indicate service change detailed information of the broadcast session.

At step 704, after the UE receives the system information, according to the identifier and the release state of the broadcast session indicated by the system information, the UE determines that the released broadcast session is a broadcast session being received by the UE, and then stops monitoring the data transmission channel of the broadcast session.

Optionally, the implementation manner five may further include a step 705 that the UE no longer monitors a notification message used to indicate that the service of the broadcast session has changed, and no longer monitors the system information used to indicate service change detailed information of the broadcast session.

It can be seen that, in the embodiments, after the UE receives the identifier of the released broadcast session and its corresponding release state in the system information, the UE stops monitoring the data transmission channel of the broadcast session, and optionally stops receiving notification messages for indicating that the service of the broadcast session has changed.

To sum up, in the embodiments of the present disclosure, in case that a state of an MBS session changes, the access network device can notify the UE of an identifier and a state of the MBS session whose state has changed, thereby solving the problem that in the existing mechanism, the UE cannot distinguish the MBS session release state from the MBS session deactivation state. Especially when the MBS session is released, the access network device can notify the UE of the identifier of the released MBS session and its corresponding release state, thereby avoiding that after the MBS session is released, in case that the MBS session does not exist (that is, there will be no more data transmission), the UE receiving the multicast session service still remains in the MBS service group, and the UE receiving the multicast or broadcast service still continues to monitor the notification message used to indicate that a service of the MBS session has changed. That is, asynchronous states of the UE and the network side can be effectively avoided, thereby effectively avoiding unnecessary power consumption of the UE.

The broadcast-multicast service session transmission control method according to an embodiment of the present disclosure has been introduced above, and a broadcast-multicast service session transmission control device according to an embodiment of the present disclosure will be described hereinafter with reference to the accompanying drawings.

Figure 8:
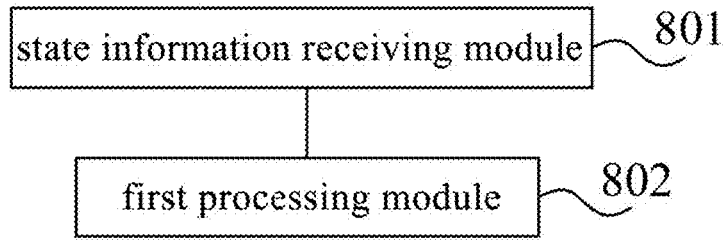
FIG. 8 is a block diagram of a broadcast-multicast service session transmission control device applied to a user equipment (UE) according to an embodiment of the present disclosure.

Referring to FIG. 8, one embodiment of the present disclosure further provides a broadcast-multicast service session transmission control device, which is applied to a user equipment (UE). The device includes:

a state information receiving module 801 configured to receive session state information of a broadcast-multicast service session, transmitted by an access network device;

a first processing module 802 configured to stop monitoring a data transmission channel of the broadcast-multicast service session, in case that the session state information indicates that the broadcast-multicast service session is in a release state.

Optionally, the session state information includes identification information of the broadcast-multicast service session and state indication information of the broadcast-multicast service session.

Optionally, the state information receiving module 801 is specifically configured to, in case that the broadcast-multicast service session is a multicast session, receive a paging message transmitted by the access network device, where the paging message carries the session state information;

or, in case that the broadcast-multicast service session is a multicast session or a broadcast session, receive a broadcast-multicast service dedicated control message transmitted by the access network device on a broadcast-multicast service control channel, where the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, receive system information transmitted by the access network device, where the system information carries the session state information, and the system information is information used to indicate a service change content of the broadcast-multicast service session.

Optionally, in case that the broadcast-multicast service session is a multicast session, the device further includes:

a second processing module configured to, in case that the session state information indicates that the multicast session is in a release state, stop monitoring a first notification message, where the first notification message is a notification message used to indicate that a service of the multicast session has changed.

Optionally, in case that the broadcast-multicast service session is a broadcast session and the session state information is carried in the broadcast-multicast service dedicated control message, the device further includes:

a third processing module configured to, in case that the session state information indicates that the broadcast session is in a release state, stop monitoring a second notification message and the broadcast-multicast service dedicated control message;

where the second notification message is a notification message used to indicate that a service of the broadcast session has changed; and the broadcast-multicast service dedicated control message is a message used to indicate a service change content of the broadcast-multicast service session.

Optionally, in case that the broadcast-multicast service session is a broadcast session and the session state information is carried in system information, the device further includes:

a fourth processing module configured to, in case that the session state information indicates that the broadcast session is in a release state, stop monitoring a second notification message and the system information;

where the second notification message is a notification message used to indicate that a service of the broadcast session has changed; and the system information is information used to indicate a service change content of the broadcast-multicast service session.

Optionally, in case that the broadcast-multicast service session is a multicast session, the first processing module is specifically configured to, control the UE to leave a multicast service group of the multicast session, so as to stop monitoring the data transmission channel of the multicast service session.

Optionally, when controlling the UE to leave a multicast service group of the multicast session, the first processing module is specifically configured to, transmit a leave request to a core network device through the access network device, where the leave request is used to instruct the core network device to remove the UE from the multicast service group of the multicast session;

or, control the UE to leave the multicast service group of the broadcast-multicast service session.

Figure 9:
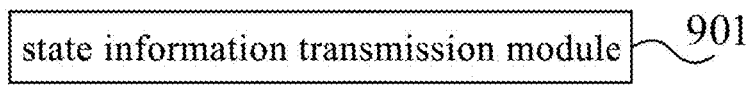
FIG. 9 is a block diagram of a broadcast-multicast service session transmission control device applied to an access network device according to an embodiment of the present disclosure.

Referring to FIG. 9, one embodiment of the present disclosure further provides a broadcast-multicast service session transmission control device, which is applied to an access network device. The device includes:

a state information transmission module 901 configured to, in case that a state of a broadcast-multicast service session changes, transmit session state information of the broadcast-multicast service session to a user equipment (UE) in the broadcast-multicast service session.

Optionally, the session state information includes identification information of the broadcast-multicast service session and state indication information of the broadcast-multicast service session.

Optionally, the state information transmission module 901 is specifically configured to, in case that the broadcast-multicast service session is a multicast session, transmit a paging message to the UE, where the paging message carries the session state information;

or, in case that the broadcast-multicast service session is a multicast session or a broadcast session, transmit a broadcast-multicast service dedicated control message to the UE on a broadcast-multicast service control channel, where the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, transmit system information to the UE, where the system information carries the session state information, and the system information is information used to indicate a service change content of the broadcast-multicast service session.

It is to be noted that division of units in the embodiment of the present disclosure is exemplary, and is only a logical function division, and there may be another division manner in actual implementation. In addition, each functional unit in each embodiment of the present application may be integrated into one processing unit, each unit may exist separately physically, or two or more units may be integrated into one unit. The foregoing integrated units may be implemented in the form of hardware or in the form of software functional units.

If the integrated units are realized in the form of software function units and sold or used as independent products, they may be stored in a processor-readable storage medium. Based on this understanding, the essence of the technical solution of the present disclosure or the part that contributes to the related art or the part of the technical solution may be embodied in the form of a software product. The computer software product is stored in a storage medium, includes several instructions which enables a computer device (which may be a personal computer, a server, or a network device, etc.) or a processor to execute all or part of the steps of the methods described in various embodiments of the present disclosure. The storage medium includes various media capable of storing program codes such as U disk, mobile hard disk, ROM, RAM, magnetic disk or optical disk.

It is to be noted here that the foregoing device provided in the embodiments of the present disclosure can implement all steps implemented by the foregoing method embodiments, and can achieve the same technical effect. Parts and beneficial effects in this embodiment that are the same as those in the method embodiment will not be described in detail here.

One embodiment of the present disclosure further provides a user equipment (UE), which includes a first memory 1020, a first transceiver 1010 and a first processor 1000.

The first memory 1020 is configured to store a computer program.

The first transceiver 1010 is configured to transmit and receive data under the control of the first processor 1000.

The first processor 1000 is configured to read the computer program in the first memory 1020 and perform the following operations:

controlling the first transceiver 1010 to receive session state information of a broadcast-multicast service session, transmitted by an access network device;

stopping monitoring a data transmission channel of the broadcast-multicast service session, in case that the session state information indicates that the broadcast-multicast service session is in a release state.

Optionally, the session state information includes identification information of the broadcast-multicast service session and state indication information of the broadcast-multicast service session.

Optionally, when receiving the session state information of the broadcast-multicast service session transmitted by the access network device, the first transceiver 1010 is specifically configured to, in case that the broadcast-multicast service session is a multicast session, receive a paging message transmitted by the access network device, where the paging message carries the session state information;

or, in case that the broadcast-multicast service session is a multicast session or a broadcast session, receive a broadcast-multicast service dedicated control message transmitted by the access network device on a broadcast-multicast service control channel, where the broadcast-multicast service dedicated control message carries the session state information, and the broadcast-multicast service dedicated control message is a message used to indicate a service change content of the broadcast-multicast service session;

or, in case that the broadcast-multicast service session is a multicast session or a broadcast session, receive system information transmitted by the access network device, where the system information carries the session state information, and the system information is information used to indicate a service change content of the broadcast-multicast service session.

Optionally, in case that the broadcast-multicast service session is a multicast session, the first processor 1000 is further configured to, in case that the session state information indicates that the multicast session is in a release state, stop monitoring a first notification message, where the first notification message is a notification message used to indicate that a service of the multicast session has changed.

Optionally, in case that the broadcast-multicast service session is a broadcast session and the session state information is carried in the broadcast-multicast service dedicated control message, the first processor 1000 is further configured to, in case that the session state information indicates that the broadcast session is in a release state, stop monitoring a second notification message and the broadcast-multicast service dedicated control message;

where the second notification message is a notification message used to indicate that a service of the broadcast session has changed; and the broadcast-multicast service dedicated control message is a message used to indicate a service change content of the broadcast-multicast service session.

Optionally, in case that the broadcast-multicast service session is a broadcast session and the session state information is carried in system information, the first processor 1000 is further configured to, in case that the session state information indicates that the broadcast session is in a release state, stop monitoring a second notification message and the system information;

where the second notification message is a notification message used to indicate that a service of the broadcast session has changed; and the system information is information used to indicate a service change content of the broadcast-multicast service session.

Optionally, in case that the broadcast-multicast service session is a multicast session, the first processor 1000 is further configured to, leave a multicast service group of the multicast session, so as to stop monitoring the data transmission channel of the multicast service session.

Optionally, when leaving a multicast service group of the multicast session, the first processor 1000 is further configured to, control the first transceiver to transmit a leave request to a core network device through the access network device, where the leave request is used to instruct the core network device to remove the UE from the multicast service group of the multicast session;

or, leave the multicast service group of the broadcast-multicast service session.

Figure 10:
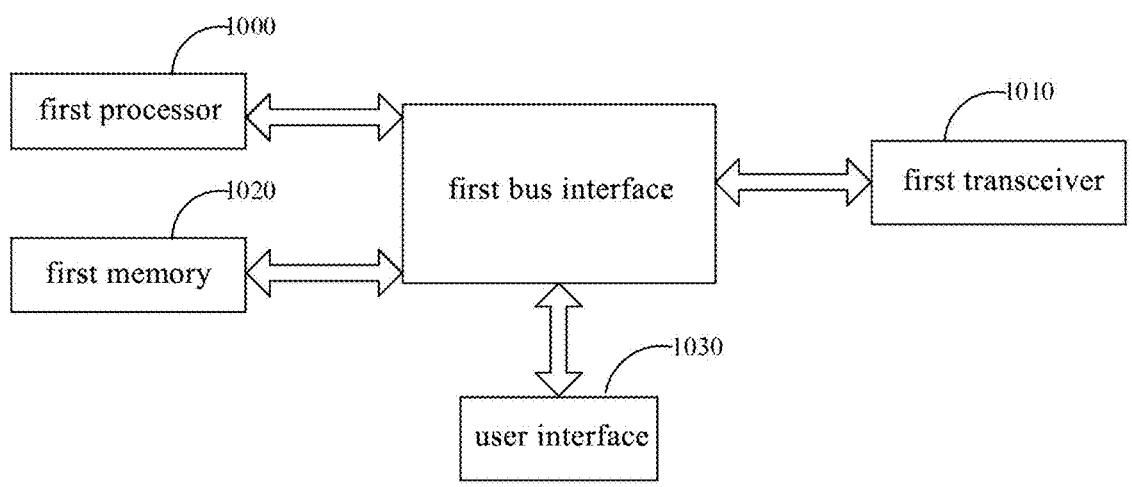
FIG. 10 is a block diagram of a user equipment (UE) according to an embodiment of the present disclosure.

In FIG. 10, a bus architecture may include any number of interconnected bus and bridge. Specifically, various circuits of one or more processors, which are represented by the first processor 1000, and one or more memories, which are represented by the first memory 1020, are linked together. The bus architecture may link various other circuits, such as a peripheral device, voltage regulator and a power management circuit together. These features are well known in this field; therefore, this disclosure does not make further description on these features. The first bus interface provides an interface. The first transceiver 1010 may be multiple elements, including a transmitter and a receiver and provide units, which communicate with other devices on the transmission medium. The transmission medium includes wireless channels, wired channels, and optical cables. For different terminals, a user interface 1030 may also be an interface capable of externally connecting required devices, and the connected devices include but are not limited to keypads, displays, speakers, microphones, joysticks, etc.

The first processor 1000 is responsible for managing the bus architecture and the normal processing. The first memory 1020 may be used to store data used by the first processor 1000 for performing operations.

Optionally, the first processor 1000 may be a central processing unit (CPU), an application specific integrated circuit (ASIC), a field-programmable gate array (FPGA) or a complex programmable logic device (CPLD). The processor may also adopt multi-core architecture.

The first processor 1000 is used to call the computer program stored in the memory, and execute any method provided in the embodiments of the present disclosure according to obtained executable instructions. The first processor 1000 and the first memory 1020 may also be physically separated.

One embodiment of the present disclosure further provides an access network device, which includes a second memory 1120, a second transceiver 1110 and a second processor 1100.

The second memory 1120 is configured to store a computer program.

The second transceiver 1110 is configured to transmit and receive data under the control of the second processor 1100.

The second processor 1100 is configured to read the computer program in the second memory 1120 and perform the following operations:

in case that a state of a broadcast-multicast service session changes, controlling the second transceiver 1110 to transmit session state information of the broadcast-multicast service session to a user equipment (UE) in the broadcast-multicast service session.

Optionally, the session state information includes identification information of the broadcast-multicast service session and state indication information of the broadcast-multicast service session.

Optionally, when transmitting session state information of the broadcast-multicast service session to a user equipment (UE) in the broadcast-multicast service session, the second transceiver 1110 is specifically configured to, in case that the broadcast-multicast service session is a multicast session, transmit a paging message to the UE, where the paging message carries the session state information; or, in case that the broadcast-multicast service session is a multicast session or a broadcast session, transmit a broadcast-multicast service dedicated control message to the UE on a broadcast-multicast service control channel, where the broadcast-multicast service dedicated control message carries the session state information, and the broadcast-multicast service dedicated control message is a message used to indicate a service change content of the broadcast-multicast service session; or, in case that the broadcast-multicast service session is a multicast session or a broadcast session, transmit system information to the UE, where the system information carries the session state information, and the system information is information used to indicate a service change content of the broadcast-multicast service session.

Figure 11:
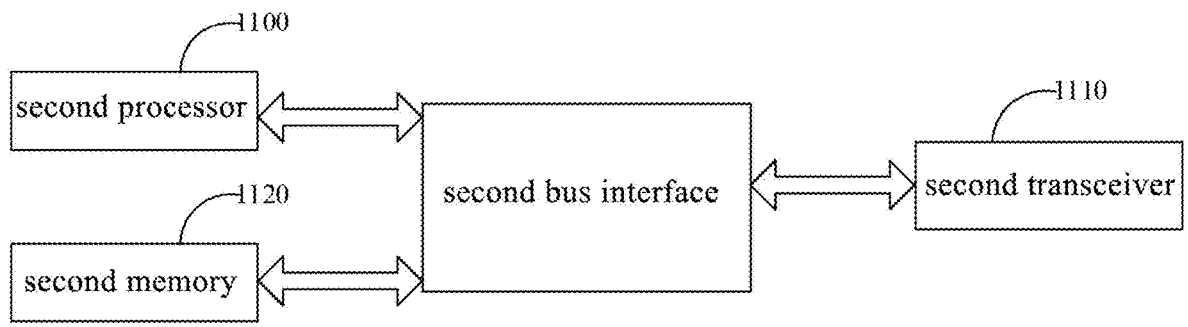
FIG. 11 is a block diagram of an access network device according to an embodiment of the present disclosure.

In FIG. 11, a bus architecture may include any number of interconnected bus and bridge. Specifically, various circuits of one or more processors, which are represented by the second processor 1100, and one or more memories, which are represented by the second memory 1120, are linked together. The bus architecture may link various other circuits, such as a peripheral device, voltage regulator and a power management circuit together. These features are well known in this field; therefore, this disclosure does not make further description on these features. The second bus interface provides an interface. The second transceiver 1110 may be multiple elements, including a transmitter and a receiver and provide units, which communicate with other devices on the transmission medium. The transmission medium includes wireless channels, wired channels, and optical cables. The second processor 1100 is responsible for managing the bus architecture and the normal processing. The second memory 1120 may be used to store data used by the second processor 1100 for performing operations.

Optionally, the second processor 1100 may be a central processing unit (CPU), an application specific integrated circuit (ASIC), a field-programmable gate array (FPGA) or a complex programmable logic device (CPLD). The second processor 1100 may also adopt multi-core architecture.

It is to be noted here that the foregoing device provided in the embodiments of the present disclosure can implement all steps implemented by the foregoing method embodiments, and can achieve the same technical effect. Parts and beneficial effects in this embodiment that are the same as those in the method embodiment will not be described in detail here.

One embodiment of the present disclosure further provides a processor-readable storage medium. The processor-readable storage medium stores a computer program. The computer program is configured to cause the processor to execute the broadcast-multicast service session transmission control method.

The processor-readable storage medium may be any available medium or data storage device that can be accessed by a processor, including but not limited to magnetic storage (such as floppy disk, hard disk, magnetic tape, magneto-optical disk (MO)), optical storage (such as CD, DVD, BD, HVD), and semiconductor memory (such as ROM, EPROM, EEPROM, non-volatile memory (Nand flash), solid-state drive (SSD)).

Those skilled in the art should understand that the embodiments of the present application may be provided as methods, systems, or computer program products. Accordingly, in this application, an entirely hardware embodiment, an entirely software embodiment, or an embodiment combining software and hardware aspects may be adopted. Further, this application may adopt the form of a computer program product implemented on one or more computer available storage media (including but not limited to disk memory and optical memory) including computer available program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These processor-executable instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These processor-executable instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The device embodiments described above are only an example. The units described as separate components may or may not be physically separated, and components shown as units may or may not be physical units, that is, they may be located in one place, or may be distributed to multiple network units. Part or all of the units may be selected according to actual needs to achieve the purpose of the solutions of the embodiments of the present disclosure. It can be understood and implemented by those skilled in the art without any creative efforts.

The various embodiments of the present disclosure may be implemented by hardware, or by software modules running on one or more processors, or in a combination thereof. Those skilled in the art should understand that a microprocessor or a digital signal processor (DSP) may be used in practice to implement some or all functions of some or all components in a computing processing device according to the embodiments of the present disclosure. The present disclosure may also be implemented as a device or apparatus program (such as computer program and computer program product) for performing a part or all of the methods described herein. Such a program realizing the present disclosure may be stored on a computer-readable medium, or may have the form of one or more signals. Such a signal may be downloaded from an internet site, or provided on a carrier signal, or provided in any other form.

Figure 12:
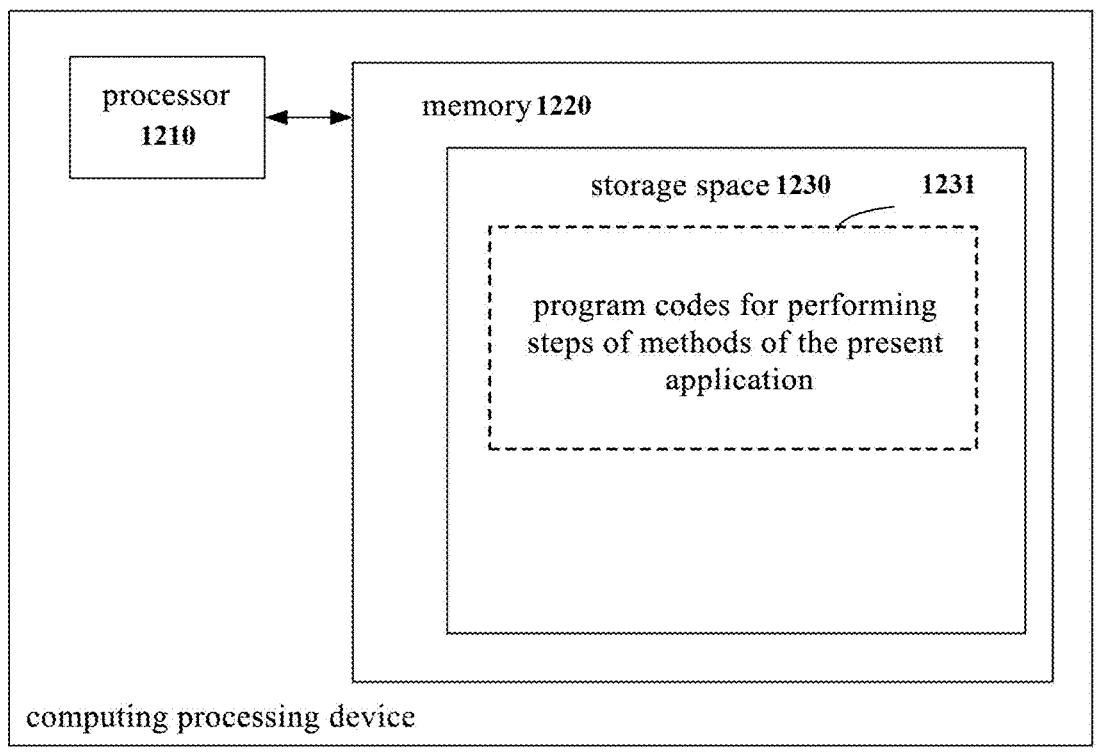
FIG. 12 is a schematic block diagram of a computing processing device for performing a method according to the present disclosure.
Figure 13:
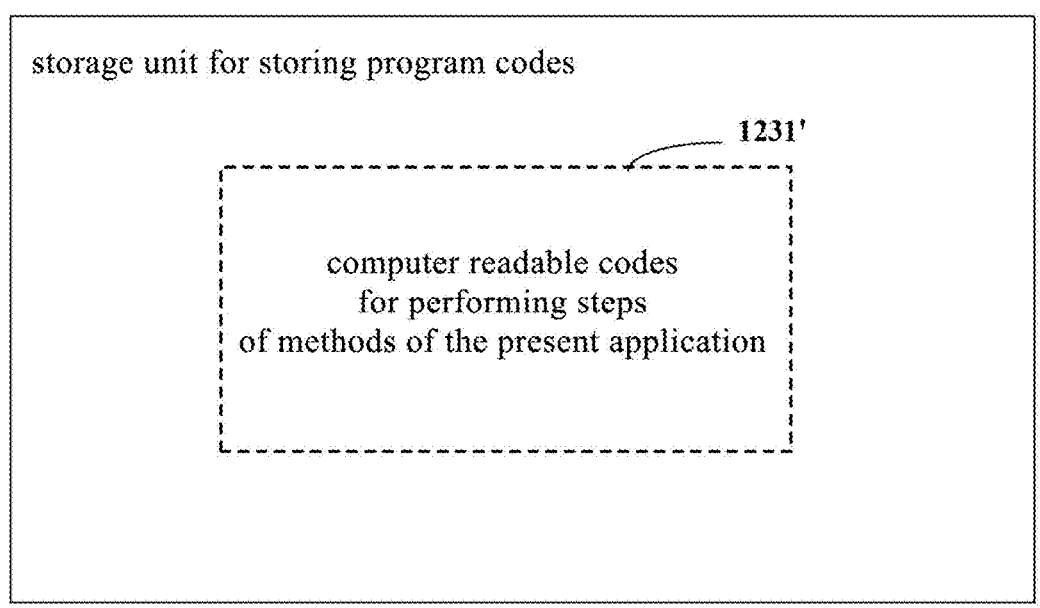
FIG. 13 schematically shows a storage unit for holding or carrying program codes for realizing a method according to the present disclosure.

For example, FIG. 12 shows a computing processing device that can implement methods according to the present disclosure. The computing processing device generally includes a processor 1210 and a computer program product or computer-readable medium in the form of memory 1220. The memory 1220 may be an electronic memory such as flash memory, EEPROM, EPROM, hard disk, or ROM. The memory 1220 has a storage space 1230 for storing program codes 1231 for performing any method steps in the methods described above. For example, the storage space 1230 for storing program codes may include respective program codes 1231 for respectively implementing various steps in the above methods. These program codes may be read from or written into one or more computer program products. These computer program products include program code carriers such as hard disks, compact disks (CDs), memory cards or floppy disks. Such a computer program product is typically a portable or fixed storage unit as shown in FIG. 13. The storage unit may have storage segments, storage spaces, etc. arranged similarly to the memory 1220 in the computing processing device of FIG. 12. The program code can, for example, be compressed in a suitable form. Typically, the storage unit includes computer readable codes 1231', i.e., codes readable by, for example, a processor such as the processor 1210. Theses codes, when executed by the computing processing device, cause the computing processing device to perform the steps of the methods described above.

"One embodiment", "an embodiment", or "one or more embodiments" involved in the present disclosure means that a particular feature, structure, or characteristic described in conjunction with an embodiment is included in at least one embodiment of the present disclosure. Additionally, it is to be noted that examples of the terms "in one embodiment" herein do not necessarily all refer to the same embodiment.

In the description provided herein, numerous specific details are provided. However, it is to be understood that embodiments of the present disclosure may be practiced without these specific details. In some instances, well-known methods, structures and techniques have not been shown in detail, in order not to obscure the understanding of this description.

In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present disclosure may be implemented by means of hardware including several distinct elements, and by means of a suitably programmed computer. In a unit claim enumerating several devices, several of these devices may be embodied by one hardware. The use of the words such as first, second, and third, does not indicate any order. These words may be interpreted as names It is obvious that those skilled in the art may make various changes and modifications to the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A broadcast-multicast service session transmission control method, applied to a user equipment (UE), comprising:
   receiving session state information of a broadcast-multicast service session, transmitted by an access network device, wherein the session state information includes identification information of the broadcast-multicast service session and state indication information of the broadcast-multicast service session, and the state indication information is used to indicate which state of an establishment, release, deactivation or activation state, the broadcast-multicast service session is in; and
   stopping monitoring a data transmission channel of the broadcast-multicast service session, in case that the session state information indicates that the broadcast-multicast service session is in a release state.

2. The method according to claim 1, wherein the receiving session state information of a broadcast-multicast service session, transmitted by an access network device, includes:
   in case that the broadcast-multicast service session is a multicast session, receiving a paging message transmitted by the access network device, wherein the paging message carries the session state information; or,
   in case that the broadcast-multicast service session is a multicast session or a broadcast session, receiving a broadcast-multicast service dedicated control message transmitted by the access network device on a broadcast-multicast service control channel, wherein the broadcast-multicast service dedicated control message carries the session state information, and the broadcast-multicast service dedicated control message is a message used to indicate a service change content of the broadcast-multicast service session; or,
   in case that the broadcast-multicast service session is a multicast session or a broadcast session, receiving system information transmitted by the access network device, wherein the system information carries the session state information, and the system information is information used to indicate a service change content of the broadcast-multicast service session.

3. The method according to claim 1, wherein in case that the broadcast-multicast service session is a multicast session, the method further includes:
in case that the session state information indicates that the multicast session is in a release state, stopping monitoring a first notification message, wherein the first notification message is a notification message used to indicate that a service of the multicast session has changed.

4. The method according to claim 1, wherein in case that the broadcast-multicast service session is a broadcast session and the session state information is carried in a broadcast-multicast service dedicated control message, the method further includes:
in case that the session state information indicates that the broadcast session is in a release state, stopping monitoring a second notification message and the broadcast-multicast service dedicated control message;
wherein the second notification message is a notification message used to indicate that a service of the broadcast session has changed; and the broadcast-multicast service dedicated control message is a message used to indicate a service change content of the broadcast-multicast service session.

5. The method according to claim 1, wherein in case that the broadcast-multicast service session is a broadcast session and the session state information is carried in system information, the method further includes:
in case that the session state information indicates that the broadcast session is in a release state, stopping monitoring a second notification message and the system information;
wherein the second notification message is a notification message used to indicate that a service of the broadcast session has changed; and the system information is information used to indicate a service change content of the broadcast-multicast service session.

6. The method according to claim 1, wherein in case that the broadcast-multicast service session is a multicast session, the stopping monitoring the data transmission channel of the broadcast-multicast service session, includes:
leaving a multicast service group of the multicast session to stop monitoring the data transmission channel of the multicast session.

7. The method according to claim 6, wherein the leaving a multicast service group of the multicast session, includes:
transmitting a leave request to a core network device through the access network device, wherein the leave request is used to instruct the core network device to remove the UE from the multicast service group of the multicast session;
or,
leaving the multicast service group of the broadcast-multicast service session.

8. A broadcast-multicast service session transmission control method, applied to an access network device, comprising:
in case that a state of a broadcast-multicast service session changes, transmitting session state information of the broadcast-multicast service session to a user equipment (UE) in the broadcast-multicast service session;
wherein the session state information includes identification information of the broadcast-multicast service session and state indication information of the broadcast-multicast service session, and the state indication information is used to indicate which state of an establishment, release, deactivation or activation state, the broadcast-multicast service session is in.

9. The method according to claim 8,
wherein the transmitting session state information of the broadcast-multicast service session to a user equipment (UE) in the broadcast-multicast service session, includes:
in case that the broadcast-multicast service session is a multicast session, transmitting a paging message to the UE, wherein the paging message carries the session state information;
or,
in case that the broadcast-multicast service session is a multicast session or a broadcast session, transmitting a broadcast-multicast service dedicated control message to the UE on a broadcast-multicast service control channel, wherein the broadcast-multicast service dedicated control message carries the session state information, and the broadcast-multicast service dedicated control message is a message used to indicate a service change content of the broadcast-multicast service session;
or,
in case that the broadcast-multicast service session is a multicast session or a broadcast session, transmitting system information to the UE, wherein the system information carries the session state information, and the system information is information used to indicate a service change content of the broadcast-multicast service session.

10. An access network device for performing the method according to claim 9, comprising: a second memory, a second transceiver and a second processor;
wherein the second memory is used to store a computer program;
the second transceiver is used to transmit and receive data under the control of the second processor;
the second processor is configured to read the computer program in the second memory and perform the following operations:
in case that the state of a broadcast-multicast service session changes, controlling the second transceiver to transmit the session state information of the broadcast-multicast service session to a user equipment (UE) in the broadcast-multicast service session;
wherein the session state information includes identification information of the broadcast-multicast service session and state indication information of the broadcast-multicast service session, and the state indication information is used to indicate which state of an establishment, release, deactivation or activation state, the broadcast-multicast service session is in.

11. The access network device according to claim 10,
wherein when transmitting the session state information of the broadcast-multicast service session to the UE in the broadcast-multicast service session, the second transceiver is used to,
in case that the broadcast-multicast service session is a multicast session, transmit a paging message to the UE, wherein the paging message carries the session state information;

or,
    in case that the broadcast-multicast service session is a multicast session or a broadcast session, transmit a broadcast-multicast service dedicated control message to the UE on a broadcast-multicast service control channel, wherein the broadcast-multicast service dedicated control message carries the session state information, and the broadcast-multicast service dedicated control message is a message used to indicate a service change content of the broadcast-multicast service session;

or,
    in case that the broadcast-multicast service session is a multicast session or a broadcast session, transmit system information to the UE, wherein the system information carries the session state information, and the system information is information used to indicate a service change content of the broadcast-multicast service session.

12. A user equipment (UE), comprising: a first memory, a first transceiver and a first processor;
    wherein the first memory is used to store a computer program;
    the first transceiver is used to transmit and receive data under the control of the first processor;
    the first processor is used to read the computer program in the first memory and perform the following operations:
    controlling the first transceiver to receive session state information of a broadcast-multicast service session, transmitted by an access network device, wherein the session state information includes identification information of the broadcast-multicast service session and state indication information of the broadcast-multicast service session, and the state indication information is used to indicate which state of an establishment, release, deactivation or activation state, the broadcast-multicast service session is in;
    stopping monitoring a data transmission channel of the broadcast-multicast service session, in case that the session state information indicates that the broadcast-multicast service session is in a release state.

13. The UE according to claim 12, wherein when receiving the session state information of the broadcast-multicast service session transmitted by the access network device, the first transceiver is used to,
    in case that the broadcast-multicast service session is a multicast session, receive a paging message transmitted by the access network device, wherein the paging message carries the session state information;

or,
    in case that the broadcast-multicast service session is a multicast session or a broadcast session, receive a broadcast-multicast service dedicated control message transmitted by the access network device on a broadcast-multicast service control channel, wherein the broadcast-multicast service dedicated control message carries the session state information, and the broadcast-multicast service dedicated control message is a message used to indicate a service change content of the broadcast-multicast service session;

or
    in case that the broadcast-multicast service session is a multicast session or a broadcast session, receive system information transmitted by the access network device, wherein the system information carries the session state information, and the system information is information used to indicate a service change content of the broadcast-multicast service session.

14. The UE according to claim 12, wherein in case that the broadcast-multicast service session is a multicast session, the first processor is further used to,
    in case that the session state information indicates that the multicast session is in a release state, stop monitoring a first notification message, wherein the first notification message is a notification message used to indicate that a service of the multicast session has changed.

15. The UE according to claim 12, wherein in case that the broadcast-multicast service session is a broadcast session and the session state information is carried in a broadcast-multicast service dedicated control message, the first processor is further used to,
    in case that the session state information indicates that the broadcast session is in a release state, stop monitoring a second notification message and the broadcast-multicast service dedicated control message;
    wherein the second notification message is a notification message used to indicate that a service of the broadcast session has changed; and the broadcast-multicast service dedicated control message is a message used to indicate a service change content of the broadcast-multicast service session.

16. The UE according to claim 12, wherein in case that the broadcast-multicast service session is a broadcast session and the session state information is carried in system information, the first processor is further used to,
    in case that the session state information indicates that the broadcast session is in a release state, stop monitoring a second notification message and the system information;
    wherein the second notification message is a notification message used to indicate that a service of the broadcast session has changed; and the system information is information used to indicate a service change content of the broadcast-multicast service session.

17. The UE according to claim 12, wherein in case that the broadcast-multicast service session is a multicast session, the first processor is further used to,
    leave a multicast service group of the multicast session, to stop monitoring the data transmission channel of the multicast service session.

18. The UE according to claim 17, wherein when leaving the multicast service group of the multicast session, the first processor is further used to,
    control the first transceiver to transmit a leave request to a core network device through the access network device, wherein the leave request is used to instruct the core network device to remove the UE from the multicast service group of the multicast session;

or,
    leave the multicast service group of the broadcast-multicast service session.

* * * * *